United States Patent [19]

Boelens et al.

[11] 4,288,349

[45] Sep. 8, 1981

[54] PERFUME COMPOSITIONS CONTAINING 3,3-DIMETHYLBICYCLO-[2,2,1]-HEPTANE-2-CARBOXYLIC ACID AS A PERFUME

[75] Inventors: Harmannus Boelens, Huizen; Roelof Ter Heide, Bussum, both of Netherlands

[73] Assignee: Naarden International N.V., Naarden-Bussum, Netherlands

[21] Appl. No.: 91,158

[22] Filed: Nov. 5, 1979

[30] Foreign Application Priority Data

Nov. 3, 1978 [NL] Netherlands ........................ 7810966

[51] Int. Cl.[3] ............................................ A23L 1/226

[52] U.S. Cl. ............................................ 252/522 R

[58] Field of Search .................................. 252/522 R

[56] References Cited

FOREIGN PATENT DOCUMENTS 7605913 of 0000 Netherlands .
7605914 of 0000 Netherlands .
1502680 3/1978 United Kingdom .
1502706 3/1978 United Kingdom .

OTHER PUBLICATIONS

Chem. Ab. 62: 11858 c.
Bull. Soc. Chim. France, No. 12, pp. 4770-4777, 1972, Chem. Ab. 79: 18868e, 1973.
Monatshefte für Chemie, 107 pp. 945-948, 1976.
Nippon Kagaku Zasshi, 85, pp. 593-597, 1964, Chem. Ab. 62: 11858e, 1965.
Dragoco Report, No. 3, pp. 55-60, 1978.
Phytochemistry, 17, No. 9, pp. 1664-1666, 1978.
Dragoco Report, No. 9, pp. 192-195, 1978.
G. Buchbauer, Monatshefte für Chemie, 109, pp. 3-9, 1978.
J. Wolinsky, J. Org. Chem., 26, pp. 4150-4151, 1961.

*Primary Examiner*—John F. Niebling
*Attorney, Agent, or Firm*—Brumbaugh, Graves, Donohue & Raymond

[57] ABSTRACT

An acidic and somewhat resinous odor note tending to cistus and olibanium is imparted to a perfume composition or product containing the same by adding the 3,3-dimethylbicyclo-(2,2,1)-heptane-2-carboxylic acid compound thereto.

6 Claims, No Drawings

PERFUME COMPOSITIONS CONTAINING 3,3-DIMETHYLBICYCLO-[2,2,1]-HEPTANE-2-CARBOXYLIC ACID AS A PERFUME

The invention relates to perfume compositions containing bicyclic monoterpenic acid having a camphene skeleton as a perfume.

There is a continuous interest in the preparation and use of synthetic fragrances since they can always be prepared in the quantity desired and with uniform quality, this contrary to naturally occurring substances.

It has been found that 3.3-dimethylbicyclo-[2.2.1]-heptane-2-carboxylic acid having the formula

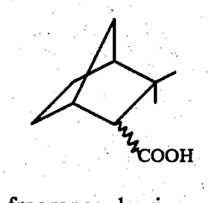

1.

is a valuable fragrance having a strong, somewhat acidic odor, a remembering of cistus oil and olibanum.

3.3-Dimethylbicyclo-[2.2.1]-heptane-2-carboxylic acid, further to be called camphenic acid, has been described in Bull. Soc. Chim. France 1972 (no. 12) pages 4770–4777, as an intermediate in the synthesis of the corresponding alcohol. Further the synthesis of this compound has been described in Monatshefte für Chemie 107, page 945 (1976), wherein is stated that it is an important starting material for the preparation of e.g. bicyclic fragrances. In Nippon Kagaku Zasshi 85, pages 593–597 (1964) it is stated that e.g. camphenic acid can be obtained by oxidation of camphene by peracids; see Chem. Abstr. 62, 11858c (1965).

In the last three references it is not hinted at all at the olfactory properties of the camphenic acid.

The compound has also been described in Dutch patent application 76,05914 as one of the many compounds having a physiological cooling effect when they are contacted with internal or external surface tissues of the body (skin, mucous membranes). Said cooling action on the skin and mucous membranes of the nasopharynx could not be observed but it has been found that the compound has a strong acidic and somewhat resinous cistus and olibanum like odor.

Further camphenic acid has been described in Dutch patent application No. 76,05913 as one of the many compounds able to enhance odor and flavor of products to be used orally in a concentration below their flavor threshold. Such an action on the odor of other fragrances, not being of direct importance for the use as a fragrance according to the invention, could not be observed.

The compound according to the invention can be used in many perfume compositions. The acid is e.g. very suitable for imparting several desirable odor notes to some synthetic essential oils, such as cistus, labdanum and olibanum.

Recently, some monoterpenic acids have been observed in olibanum oil [vide Dragoco Report 1978 (no. 3) pages 55–60 and Phytochemistry 17 (no. 9) 1978, pages 1664–1666] and in labdanum oil [vide Dragoco Report 1978 (no. 9) pages 192–195], e.g. the bicyclic acids myrtenic acid and thujanic acid having the formulae

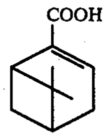

2

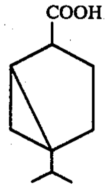

3

The chemical structure of said acids strongly differs from that of camphenic acid and therefore it is surprising that just camphenic acid can be used successfully in the essential oils mentioned.

Methods for the synthesis of camphenic acid have been described in the references cited above. The compound can be prepared by oxidation of a solution of camphene in an alkyl formiate having a low alkyl radical, e.g. ethyl formiate with an aqueous hydrogen peroxide solution, according to the following scheme:

FIG.

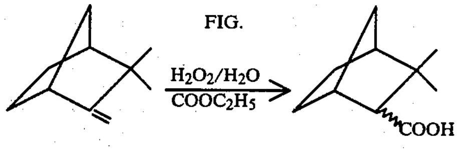

According to this reaction a mixture of endo- and exo-isomers is obtained. Said isomers can be isolated from the mixture according to usual separation methods. For the use as a fragrance it is not necessary to separate the isomers and the mixture of them can be used as such.

As stated above camphenic acid can be used successfully in perfume compositions or as such as an odor imparting substance.

The phrase "perfume composition" is used to mean a mixture of fragrance and optionally auxiliary substances that may be solved in an appropriate solvent or mixed with a powdery substrate used to impart a desired odor to the skin and/or various products. Examples of said products are: soaps, washing agents, dish washing and cleaning agents, air refreshers and room sprays, pommanders, candles, cosmetics such as creams, colognes, pre- and after-shaving lotions, talcum powders, hair care agents, body deodorants and antiperspirants.

Fragrances and mixtures thereof which can be used for the preparation of perfume compositions are e.g. naturally occurring products such as essential oils, absolutes, resinoids, resins, concretes a.s.o., but also synthetic fragrances, such as hydrocarbons, alcohols, aldehydes, ketones, ethers, acids, esters, acetals, ketals, nitrils a.s.o., covering saturated and unsaturated compounds, aliphatic, carbocyclic and heterocyclic compounds. Examples of fragrances to be used in combination with the compounds according to the invention are: geraniol, geranyl acetate, linalool, linalyl acetate, tetrahydrolinalool, citronellol, citronellyl acetate, myrcenol, myrcenyl acetate, dihydro myrcenol, dihydro myrcenyl acetate, tetrahydro myrcenol, terpineol, terpinyl acetate, nopol, nopyl acetate, β-phenyl ethanol, β-phenylethyl acetate, benzyl alcohol, benzyl acetate, benzyl salicylate, benzyl benzoate, amyl salicylate, styrallyl acetate, dimethylbenzyl carbinol, trichloro methylphenylcarbinyl acetate, p-tert.butyl cyclohexyl acetate, isononyl acetate, vetiveryl acetate, vetiverol, α-hexyl cinnamon aldehyde, 2-methyl-3-(p-tert.butylphenyl)-propanol, 2-methyl-3-(p-isopropyl phenyl)-propanol, 3-(p-tert.butylphenyl)-propanol, tricy clododecenyl acetate, tricyclododecenyl propionate, 4-(4-hydroxy-4-methylpentyl)-3-cyclohexene carbaldehyde, 4-(4-methyl-3-pentenyl)-3-cyclohexene carbaldehyde, 4-acetoxy-3-pentyl-tetrahydro pyran, 3-carboxymethyl-2-pentylcyclopentane, 2-n-heptyl cyclopentanone, 3-methyl-2-pentyl-2-cyclopentanone, n-decanal, n-dodecanal, 9-decenol-1, phenoxyethyl isobutyrate, phenyl acetaldehyde dimethylacetal, phenyl acetaldehyde diethylacetal, geranyl nitril, citronellyl nitril, cedryl acetate, 3-isocamphyl cyclohexanol, cedrylmethyl ether, isolongifolanon, aubepine nitrile, aubepine, heliotropine, coumarine, eugenol, vanilline, diphenyl oxide, hydroxy citronellal, ionones, methyl ionones, isomethyl ionones, irones, cis-3-hexenol and esters thereof, indan musk fragrances, tetraline musk fragrances, isochroman musk fragrances, macrocyclic ketones, macrolactone musk fragrances, ethylene brassylate, aromatic nitromusk fragrances.

Auxiliary agents and solvents that may be incorporated into perfume compositions according to the invention are e.g. ethanol, isopropanol, diethyleneglycol monoethylether, diethyl phthalate a.s.o.

The amount of camphenic acid that can be used in a perfume composition or in a perfumed product can be varied within broad limits and depends e.g. on the product wherein the perfume is used, the nature and the amount of the further components of the perfume composition and the odor effect desired. Therefore, it is only possible to indicate very rough limits, which give, however, a person skilled in the art sufficient information concerning the odor strength and possibilities for the use of camphenic acid. In most cases a quantity of only 0.01% in a perfume composition is sufficient to obtain a clearly observable odor effect.

In products perfumed with the aid of perfume compositions according to the invention the concentration is lower and depends on the quantity of the composition used in the product. In some cases, however, concentrations of 60% are usable in the compositions to impart specific odor notes.

The following examples only illustrate the preparation and the use of camphenic acid and donot restrict the invention thereto.

EXAMPLE 1

Preparation of camphenic acid

A mixture of 27.2 g camphene and 30 g ethyl formiate is refluxed. During some hours carefully 30 g 60-percent's hydrogen peroxide is added dropswise with continuous agitation. Subsequently the mixture is stirred another 1.5 hours. The mixture is stand over night and subsequently the solvent is distilled off at atmospheric pressure. 20 g toluene is added to the residue, the water layer is separated and the organic layer is washed twice with water. The toluene solution is evaporated until about 26 g residue has been obtained.

Subsequently 40 g 20% sodium hydroxide solution is added, the mixture is boiled 1 hour with vigorous stirring. The water layer is separated, acidified with concentrated hydrochloric acid and extracted with toluene. The toluene extract is washed with water and then evaporated in vacuo. The residue is fractionated in vacuo and 11 g camphenic acid is obtained.

Boiling point=115°-120° C./2 mm; $n_D^{20}$: 1.4845-1.4860.

EXAMPLE 2

A perfume composition of the oriental type is prepared according to the following recipe:

| | |
|---|---|
| 70 parts by weight | Coumarine |
| 30 | Musk Ambrette |
| 20 | 7-acetyl-1.1.3.4.4.6-hexamethyl tetralin |
| 100 | α-terpineol |
| 30 | labdanum resinoid |
| 70 | terpinyl acetate |
| 80 parts by weight | linalool |
| 50 | citronellol |
| 30 | lavender oil French |
| 50 | Spike lavender oil |
| 60 | Patchouly oil |
| 70 | geranium oil Bourbon |
| 30 | eugenol |
| 30 | sandalwood oil |
| 60 | acetyl cedrene |
| 70 | cedarwood oil |
| 50 | camphenic acid |
| 900 parts by weight | |

EXAMPLE 3

A perfume composition of the pine fragrance type was prepared according to the following recipe:

| | |
|---|---|
| 50 parts by weight | coumarine |
| 25 | musk ketone |
| 50 | terpinyl acetate |
| 10 | mousse absolute Yugoslavic |
| 600 | bornyl acetate |
| 15 | geranium oil African |
| 40 | amyl salicylate |
| 25 parts by weight | 2-methyl-3-(paraisopropyl phenyl)-propanal |
| 20 | methylnonyl acetaldehyde |
| 15 | aldehyde C10 |
| 20 | 4-(4-methyl pentene-3-yl)-cyclohexene-3-carbaldehyde |
| 50 | pine-needle oil Siberian |
| 80 | camphenic acid |
| 1000 parts by weight | |

EXAMPLE 4

A perfumed soap is prepared by mixing intensively 1 kg white soap grains, 25 g perfume composition according to example 2 and 10 g soap colour in a soap mill. Perfumed coloured soap flakes were obtained that were pressed to pieces of toilet soap in a usual way. The soap thus obtained had an agreeable and stabile odour.

EXAMPLE 5

A room spray having pine odour was prepared by mixing 27.2 g absolute alcohol, 2 g propylene glycol, 4.8 g diethylene glycol and 166 g freon with 1.2 g perfume composition obtained according to example 3.

Aerosol bombs were filled with the obtained mixture.

We claim:

1. A perfume composition containing 3,3,-dimethyl-bicyclo-[2,2,1]-heptane-2-carboxylic acid as a fragrance to impart an acidic and somewhat resinous odor tending to cistus and olibanum.

2. A perfume composition according to claim 1 containing at least 0,01% by weight of said acid.

3. A process for the preparation of a perfume composition which comprises incorporating 3,3-dimethylbicyclo-[2,2,1]-heptane-2-carboxylic acid as a fragrance with other fragrances, and optional auxiliary agents and solvents.

4. A method of imparting an acidic and somewhat resinous odor note tending to cistus and olibanum to a product comprising the step of applying to said product, a perfume composition comprising 3,3-dimethylbicyclo-[2,2,1]-heptane-2-carboxylic acid in an amount effective to provide said odor note.

5. The method of claim 4 wherein said compound 3,3-dimethylbicyclo-[2,2,1]-heptane-2-carboxylic acid is present at a level of at least 0.01% by weight percent in said perfume composition.

6. A method of imparting an acidic and somewhat resinous odor tending to cistus and olibanum to a perfume composition comprising the step of adding to said perfume composition 3,3-dimethylbicyclo-[2,2,1]-heptane-2-carboxylic acid in an amount effective to provide said odor note.

* * * * *